United States Patent Office
3,464,374
Patented Sept. 2, 1969

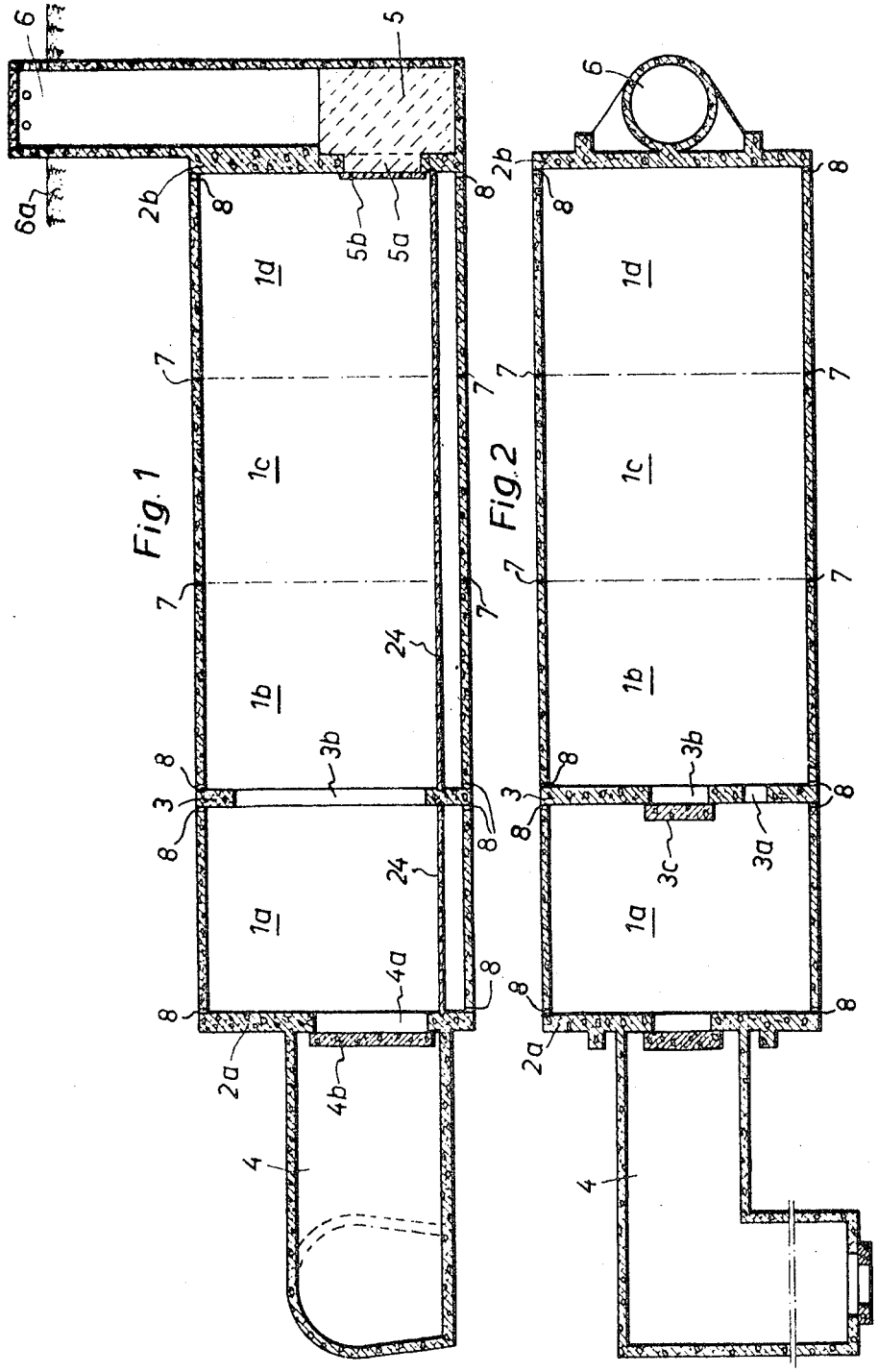

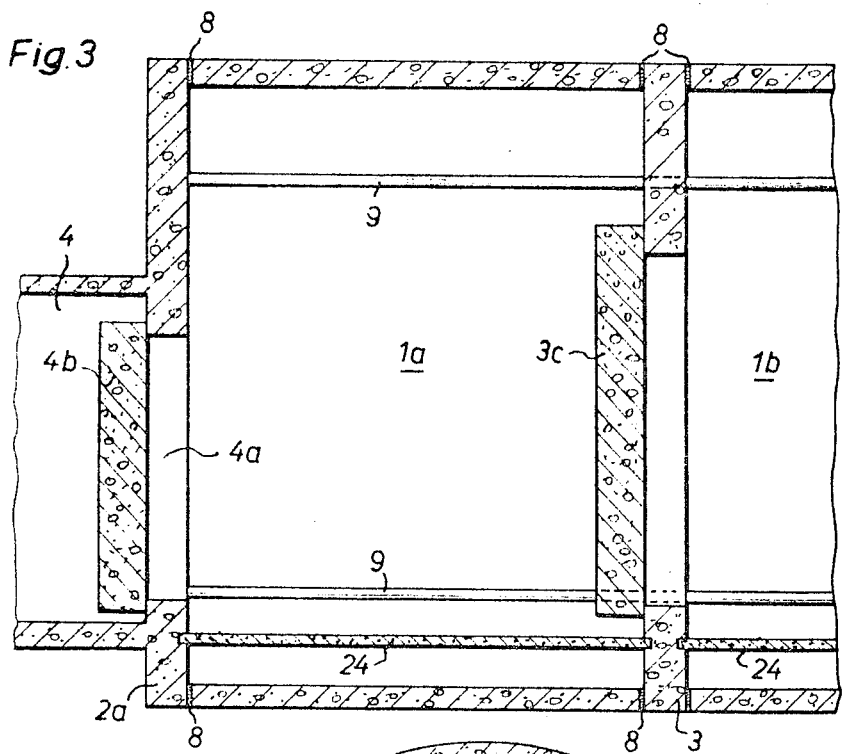
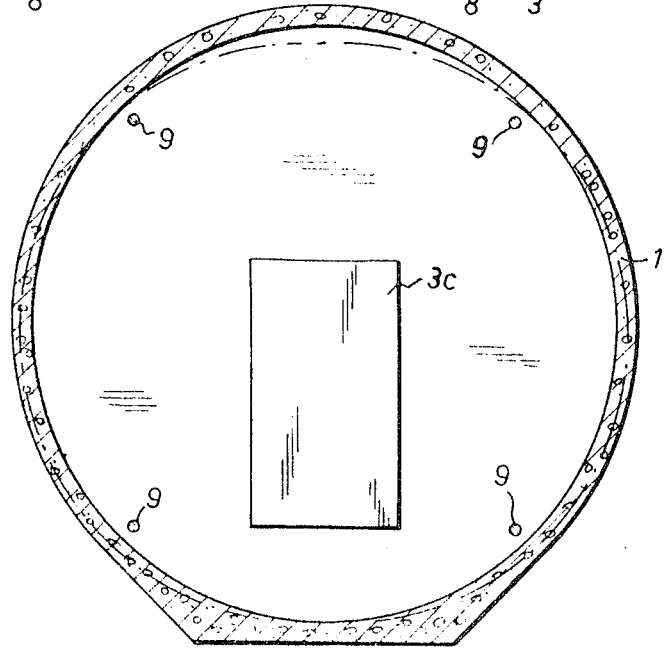

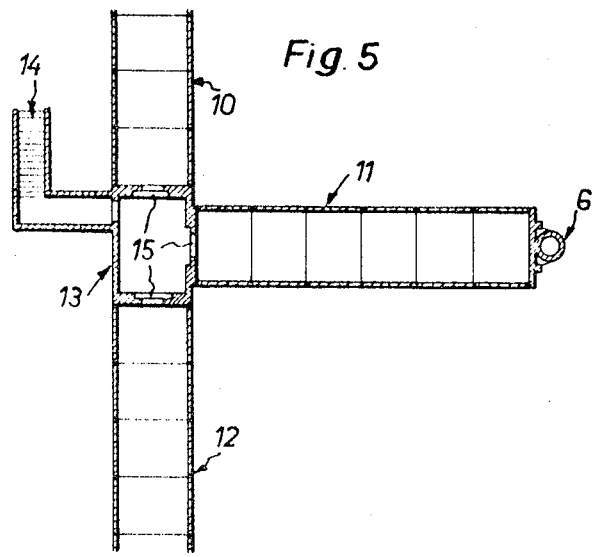
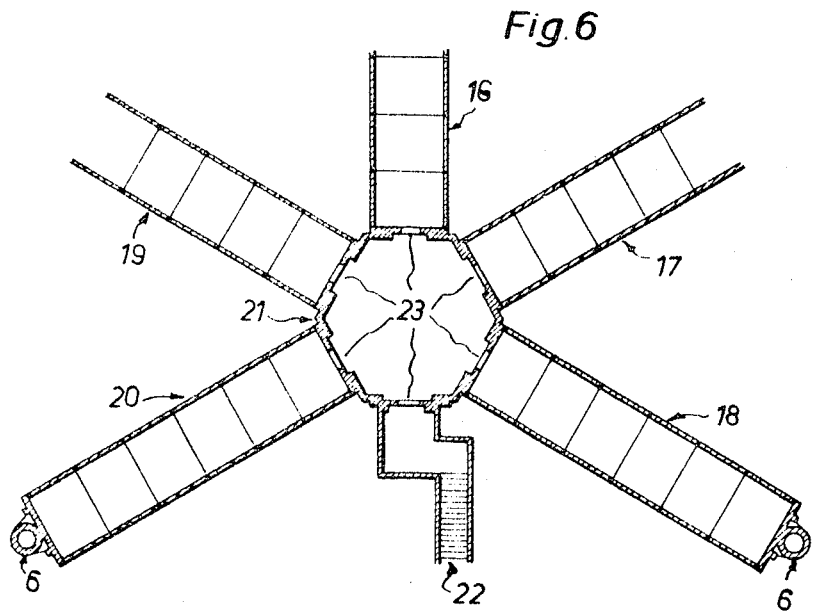

3,464,374
UNDERGROUND SHELTER
Ernst Basler, Sillerwies 17, Zurich, Switzerland, and Hans Frehner, Sonnenhaldenstrasse 64, Saint Gall, Switzerland
Filed July 5, 1966, Ser. No. 562,617
Claims priority, application Switzerland, July 8, 1965, 9,582/65
Int. Cl. E05g 3/00
U.S. Cl. 109—1                              2 Claims

ABSTRACT OF THE DISCLOSURE

An underground shelter for protection against the effects of a nuclear blast constituted by an assembly of a plurality of tubular elements in end-to-end arrangement with structural members at its ends for closing the shelter while furnishing access to the assembly. The tubular elements have relatively thin walls so as to be resilient and elastically and plastically deformable, the ends of said tubular elements being connected to one another and to the structural members so as to be relatively slidable in a transverse direction, thereby permitting the shelter to yield under the action of substantial force without structural failure.

---

In the design of shelters against nuclear weapons the conventional construction principles have been retained. By suitably strengthening and rigidifying the shell of the shelter, it has been sought to meet the enormously increased explosive force of nuclear weapons. The construction costs of these shelters have continually increased, leading to a search for shapes that would allow a more reasonable cost per person sheltered. Nevertheless, the cost of nuclear shelters remains so high that shelters for the entire population of a country cannot be contemplated at the present time.

The increased construction costs limit the extent to which conventional methods can be employed to improve the reliability of shelters against nuclear weapons.

An object of the invention is to provide an underground shelter against nuclear weapons that affords a very high degree of protection from all directions, yet is inexpensively mass produced.

In accordance with the invention there is provided an underground shelter for protection against the effects of a nuclear blast which is constituted as an assembly of a plurality of tubular elements in end-to-end arrangement with structural members at its ends for closing the shelter while furnishing access to the assembly. The tubular elements have relatively thin walls so as to be resilient and elastically and plastically deformable in cooperation with the surrounding earth. The adjacent ends of the tubular elements are relatively slidable in a transverse direction as are the tubular elements which are connected to the structural members, thereby permitting the shelter to yield under the action of substantial force without structural failure.

The tubular elements may be formed with gaps therebetween which are filled with a sealing material which has substantially no influence on the relative transverse sliding capability of the tubular elements. Similarly, such gaps may be formed between the structural members and the adjacent tubular elements and a similar sealing material inserted in such gaps.

The structural members at the ends of the assembly may be connected to one another by means of prestressed tension members. Such tension members may extend axially in the assembly.

Further features of the invention will be apparent from the following detailed description, with reference to the accompanying drawings, wherein:

FIGURES 1 and 2 are side and top views in section of one form of the invention;
FIGURES 3 and 4 are detail views in section of the example of FIGURES 1 and 2; and
FIGURES 5 and 6 are top views in section of two additional embodiments of the invention.

Referring to FIGURES 1 and 2, the underground shelter against nuclear weapons includes four successively arranged tubular elastic, plastic sections 1a, 1b, 1c, 1d, shown in cross section in FIGURE 4. The sections advantageously are prefabricated and, in accordance with the invention, are made of a cement or other building material, known in the art, capable of elastic and plastic deformation. The sections 1a, 1d, are closed off by end walls 2a, 2b that form the front and rear terminations of the shelter. A partition wall 3 separates section 1a from the remaining sections 1b–1d, the latter sections being the sheltering chamber proper while section 1a is a lock. The wall 3 can be provided with a small communications opening 3a closable by any suitable means, not shown. The larger entrance opening 3b is closable also by any appropriate means, shown in FIGURE 2 as a slab 3c, not illustrated in FIGURE 1. Wall 2a has a closable opening 4a, by which access is obtained to the shelter from the entrance 4. The rear wall 2b also has an opening 5a covered by blast absorbing material 5 and leading to an emergency exit 6 that extends vertically to the surface 6a. The entrance 4, which is a right angle passage provided with a stairway, can be replaced by a vertical shaft similar to that of the emergency exit 6. The openings 4a, 5a, and their closures 4b, 5b can be of any suitable form and construction.

The adjacent ends of sections 1a, b, c, d form smooth spacings 7, which are free of couplings, grooves, and the like. These spacings are filled with a suitable sealer that prevents, under normal conditions, any relative change in position between the sections; but which, in the presence of shock pressure, caused by a nuclear explosion, permits a relative shifting, without, however, there being any danger of a brittle rupture. Although not essential, a floor 24 can be provided.

The four similar tubular sections of the above embodiment can be replaced by a single tubular section having a length, however, preferably less than that of the four sections together.

The end walls 2a, 2b and the partition 3 are joined to the section by a sealer which fills the spacings between the joints 8 and assures a good connection under normal conditions. However, the sealer should at least be plastic so as not to be absolutely resistant to movements caused by a nuclear explosion. A mortar is suitable, as is a sealer that is elastically, as well as plastically, deformable.

In the presence of a vertical shock, propagated normal to the pipe section or, in the illustrated embodiment, sections, each section is distorted, as shown in dot-dash line in FIGURE 4, for example. The ends of the pipe sections, because of the gaps 7, 8, are advantageously permitted to flex with respect to the end walls 2a, 2b and the partition wall 3. A portion of the force exerted on the shelter is transferred to the surrounding earth, without destruction of the shelter.

In the event that the shock wave of the explosion is propagated along the length of the shelter, one of the rigid end walls bears the brunt of the pressure shock and transmits the shock in the same direction to the adjacent pipe ends, whereupon the shock is propagated along the length of the pipe section or sections until it is received by the other end wall and partly transferred to the surrounding earth and partly returned as a reflected wave. If the explosion center lies at some angle transverse to the shelter, the angle of impact of the stress will be more or less oblique to the shelter, and the resulting strain will lie somewhere between the two limiting cases discussed above.

The maximum load point of the shelter, because of the above construction, is very appreciably raised. By eliminating rigid connections between tube sections and between tube sections and the end walls—that is, eliminating stiff members between adjacent walls—dangerous over straining of the material at the transfer points is avoided. The shelter, because of its shape, makes full use of the ability to yield, and offers an optimum resistance to shock pressure.

In order to ensure that the shelter is held together as a unit, it is prestressed normal to the gaps 7, 8. This is obtained by tensioning members 9 extending freely from one end to the other of the shelter and which are embedded in the end walls 2a, 2b, placing the latter under a constant force pulling them towards the adjacent ends of the pipe sections. In the event that the shock pressure is propagated normal to the shelter, the tensioning members prevent chipping of the walls 2a, 2b, 3 and hold the gaps 8 closed.

FIGURES 5 and 6 illustrate two further embodiments of the invention. FIGURE 5 shows an assembly of three shelters extending at right angles from a common lock 13, serving the role of lock 1a of FIGURES 1–3, and which is entered by way of a staircase 14. Each of the entrances 15 to a shelter can be closed by any suitable means. Each of the shelters 10, 11, 12 is composed of a series of tubular or pipe sections (here six), as in the preceding illustrated embodiment, terminated by an emergency exit 6. Each shelter 10–12 is advantageously separated from the lock 13 by a spacing not shown, filled with at least a plastic sealer. This construction also holds true for the form of FIGURE 6.

The variation of FIGURE 6 depicts a plurality of shelters 16–20 radiating from a common lock 21, entered by way of a staircase 22. Again, each shelter is comprised of several pipe sections (in this case six) ending in an emergency exit 6. Each of the entrances is closable by any suitable means.

Each of the shelters of FIGURES 5 and 6 is advantageously provided with tensioning members, as in the example of FIGURES 1–4.

It will be understood that in all of the embodiments suitable means are provided in a known manner for ventilating the shelter area.

We claim:

1. An underground shelter for protection against the effects of a nuclear blast, said shelter comprising an assembly of a plurality of tubular elements in end-to-end arrangement, said assembly having opposite ends, structural means at said ends for closing the same while furnishing access to the assembly, said tubular elements having relatively thin walls so as to be resilient and elastically and plastically deformable in cooperation with the surrounding earth, the adjacent ends of said tubular elements in said assembly being relatively slidable in a transverse direction, said structural means and the opposed ends of the adjacent tubular elements being relatively slidable in a transverse direction, the relative slidable capability of the tubular elements with respect to one another and to the structural means permitting the shelter to yield under the action of substantial force without structural failure, adjacent tubular elements having planar surfaces in spaced relation thereby forming gaps between the tubular elements, and a sealing material in said gaps which has substantially no influence on the relative transverse sliding capability of the tubular elements, said structural means and the adjacent tubular elements having opposed spaced planar surfaces forming gaps therebetween, and a sealing material in the latter said gaps which has substantially no influence on the relative transverse sliding capability of the structural means and the adjacent tubular elements, and prestressed tension members connecting said structural means at the ends of the tubular elements to one another and to the assembly of the tubular elements.

2. A shelter as claimed in claim 1 wherein said tension members extend axially in the assembly.

References Cited

UNITED STATES PATENTS

| 744,199 | 11/1903 | Hubbell. | |
|---|---|---|---|
| 2,716,864 | 9/1955 | Hacker. | |
| 2,888,870 | 6/1959 | Drager. | |
| 2,903,874 | 9/1959 | Drager | 52—169 |
| 2,977,723 | 4/1961 | Rudinger | 52—169 |

FOREIGN PATENTS 1,031,666   6/1966   Great Britain.

OTHER REFERENCES

Catalog "Portland Cement," Dec. 20, 1963, pp. 1 and 2.

REINALDO P. MACHADO, Primary Examiner